United States Patent [19]
Imaino et al.

[11] Patent Number: 5,929,326
[45] Date of Patent: Jul. 27, 1999

[54] GLIDE SENSOR INTEGRATED SUSPENSION

[75] Inventors: Wayne I. Imaino; Francis C. Lee; Mike L. McGhee; Salvador Navarro; Ullal V. Nayak; Tzong S. Pan; Wing C. Shum; Randall G. Simmons, all of San Jose, Calif.

[73] Assignee: International Business Machines Corporation, Armonk, N.Y.

[21] Appl. No.: 08/861,482

[22] Filed: May 22, 1997

[51] Int. Cl.⁶ .................................................. G01B 5/28
[52] U.S. Cl. ............................................................ 73/105
[58] Field of Search ....................... 73/105, 106; 360/104

[56]     References Cited

U.S. PATENT DOCUMENTS

| 4,360,754 | 11/1982 | Yoyoshima et al. | 310/366 |
| 4,532,802 | 8/1985 | Yeack-Scranto et al. | 73/432 R |
| 5,237,861 | 8/1993 | Suda et al. | 73/105 |
| 5,313,352 | 5/1994 | Chikazawa et al. | 360/103 |
| 5,423,207 | 6/1995 | Flechsig et al. | 73/104 |
| 5,450,747 | 9/1995 | Flechsig et al. | 73/105 |
| 5,528,922 | 6/1996 | Baumgart et al. | 73/1.79 |
| 5,530,604 | 6/1996 | Pattanaik | 360/104 |
| 5,539,592 | 7/1996 | Banks et al. | 73/105 X |
| 5,598,307 | 1/1997 | Bennin | 360/104 |
| 5,689,064 | 11/1997 | Kennedy et al. | 73/105 |
| 5,699,212 | 12/1997 | Erpelding et al. | 360/104 |

FOREIGN PATENT DOCUMENTS

| 53-69623 | 6/1978 | Japan . |
| 62-95782 | 5/1987 | Japan . |

OTHER PUBLICATIONS

"Efficient Piezoelectric Glide Transducer for Magnetic Recording Disk Quality Assurance", IBM Technical Disclosure Bulletin, vol. 34, No. 4A, Sep. 1991, p. 459.

"Reproduction of Slider Vibrations during Head/Disk Interactions using PZT Sensors", A. Wallash, IEEE Transactions on Magnetics, vol. 24, No. 6, Nov. 1988, pp. 2763–2765.

*Primary Examiner*—Daniel S. Larkin
*Attorney, Agent, or Firm*—John H. Holcombe; Douglas R. Millett

[57]              ABSTRACT

A glide sensor suspension assembly for supporting a glide sensor having a slider and a sensor element. The suspension assembly comprises a load beam support member having a load dome projection at one end thereof, and a flexure member having first and second sections, the first section fixedly attached to the load beam support member, and the second section comprising a gimbal flexure section having the slider affixed thereon supported by the load dome projection of the load beam support member. Integrated electrical leads are formed on the flexure member, the electrical leads having output connections at the first section and are connected at the second section to the sensor element, so that the sensor element is electrically connected to the output connections.

6 Claims, 7 Drawing Sheets

GLIDE SENSOR INTEGRATED SUSPENSION

Commonly assigned U.S. Pat. No. 5,423,207 is incorporated for its showing of a piezoelectric glide sensor and method for analyzing a mechanical surface over which the sensor is suspended during glide movement therebetween.

TECHNICAL FIELD

This invention relates to glide sensors for analyzing a mechanical surface and, more particularly, to an integrated lead suspension (ILS) assembly for supporting the glide sensor.

BACKGROUND OF THE INVENTION

Glide sensors are employed to analyze mechanical surfaces, and specifically are employed to analyze the surfaces of rigid magnetic recording disks. Such disks are utilized in magnetic storage disk drives, which comprise magnetic transducers supported on air bearing sliders in close proximity to relatively moving magnetic recording disks. The recording surface of the rigid magnetic recording disks are typically coated with a layer of magnetic material applied by sputtering.

Coated disks must be free of asperities to assure long term reliability and data integrity at the transducer to disk interface, since asperities can lead to undesirable slider-disk contact.

In order to increase disk drive data capacity without increasing the size of the drives, the transducers are of ever decreasing dimensions and the tracks of the disks are of ever decreasing widths, so that the magnetic fields are also of ever decreasing amplitudes. Thus, a magnetic transducer must be in even closer proximity to the disk recording surface to maximize its efficiency and sensitivity to read and write data.

The progressive reduction in slider flying height to bring the magnetic transducer into closer proximity with the recording surface of the disk requires a concomitant decrease in the asperity height (roughness) on the surface of the recording surface of the disk.

The process of detecting and rejecting disks with asperities is called a glide test. The glide sensor typically comprises a glide slider which is flown over the recording surface of the disk at a height equal to or below the desired magnetic transducer fly height. The slider is provided with a contact sensor which is bonded to an upper surface facing away from the recording surface. Piezoelectric sensors are typically used as the contact sensors because they generate an electric charge in response to internal stress. As the slider experiences rigid body displacement and flexural deformation, the bonded sensor responds by generating a charge signal which may be monitored. The incorporated '207 patent describes such a glide sensor.

Critical to the performance of the glide sensor is the ability to maintain a tightly controlled flying height and flying attitude (roll and pitch) of the glide slider to be able to make contact with disk asperities in a predictable manner.

The data sliders the modern format is called "Pico" (1.25 mm long by 1.00 mm wide and 0.3 mm thick), and future data sliders will be even smaller. Since the size of the slider air bearing surface determines the response of the slider flying over the disk surface, the glide slider needs to be of similar size in order to mimic the response of the data slider to the disk topology variation to detect asperities effectively.

A problem in using the Pico format for a glide slider is the increased sensitivity of flying height and flying attitude to the suspension static stiffnesses. If the static stiffness of the suspension is high, residual moments from the suspension that holds the slider above the disk surface tend to pitch or roll the slider out of an optimal flying attitude necessary for glide testing. Another problem is that the discrete wires used to connect the glide sensor to an output tend to add additional random moments that can significantly affect the glide slider attitude and flying height. This is because discrete wires usually have large positional variations due to assembly processes.

Thus, what is needed is a suspension for glide sensors which reduces static stiffness and avoids random moments, while providing electrical connections between the glide sensor and an output.

SUMMARY OF THE INVENTION

Disclosed is a glide sensor suspension assembly for supporting a glide sensor having a slider and a sensor element. The suspension assembly comprises a load beam support member having a load dome projection at one end thereof, and a flexure member having first and second sections, the first section fixedly attached to the load beam support member, and the second section comprising a gimbal flexure section having the slider affixed thereon supported by the load dome projection of the load beam support member. Integrated electrical leads are formed on the flexure member, the electrical leads having output connections at the first section and at the second section the leads are connected to the sensor element at electrical connection pads, so that the sensor element is electrically connected to the output connections.

Thus, a suspension for glide sensors is provided which reduces static stiffness and avoids random moments by the use of integrated leads and a flexible gimbal system, while providing electrical connections between the glide sensor and an output.

For a fuller understanding of the present invention, reference should be made to the following detailed description taken in conjunction with the accompanying drawings.

DETAILED DESCRIPTION OF THE INVENTION

As discussed above, the progressive reduction in magnetic disk drive slider flying height to bring the magnetic transducer into closer proximity with the recording surface of the disk requires a concomitant decrease in the asperity height (roughness) on the surface of the recording surface of the disk.

The process of detecting and rejecting disks with asperities is called a glide test. The glide sensor typically comprises a glide slider which is flown over the recording surface of the disk at a height equal to or below the desired magnetic transducer fly height. The slider is provided with a sensor element which is bonded to an upper surface facing away from the recording surface.

Many alternative types of glide sensor elements may be utilized for detecting asperities. Examples include 1) piezoelectric sensors comprising piezoelectric material bonded to the slider of various shapes and having conductors on the top and bottom of the sensor; 2) capacitance sensors which derive a signal from the capacitance from the slider; 3) mechanical structures that undergo resonant vibration; and 4) piezoresistive sensors that display resistance changes due to strain that occurs during slider asperity contact.

The incorporated '207 patent describes an advanced piezoelectric glide sensor. Piezoelectric sensors are typically used because they generate an electric charge in response to internal stress from slider asperity contact. As the slider experiences rigid body displacement and flexural deformation, the bonded sensor element responds by generating a charge signal which may be monitored. The '207 patent partitions the top conductor layer along the lines of symmetry of the slider's stress distribution, which is related to the piezoelectric material's generated charge. The piezoelectric sensor element is conventionally connected to output connections for asperity analysis by means of discrete wires.

Other asperity contact sensors, such as piezoresistive sensors, have similar connections made by means of discrete wires.

As discussed above, a problem in using the smaller slider formats, such as Pico format, for a glide slider is the increased sensitivity of flying height and flying attitude to the suspension static stiffnesses. If the static stiffness of the suspension is high, residual moments from the suspension that holds the slider above the disk surface tend to pitch or roll the slider out of an optimal flying attitude necessary for glide testing. Another problem is that the discrete wires used to connect the glide sensor to an output tend to add additional random moments that can significantly affect the glide slider attitude and flying height. This is because discrete wires usually have large positional variations due to assembly processes.

Figure 1:
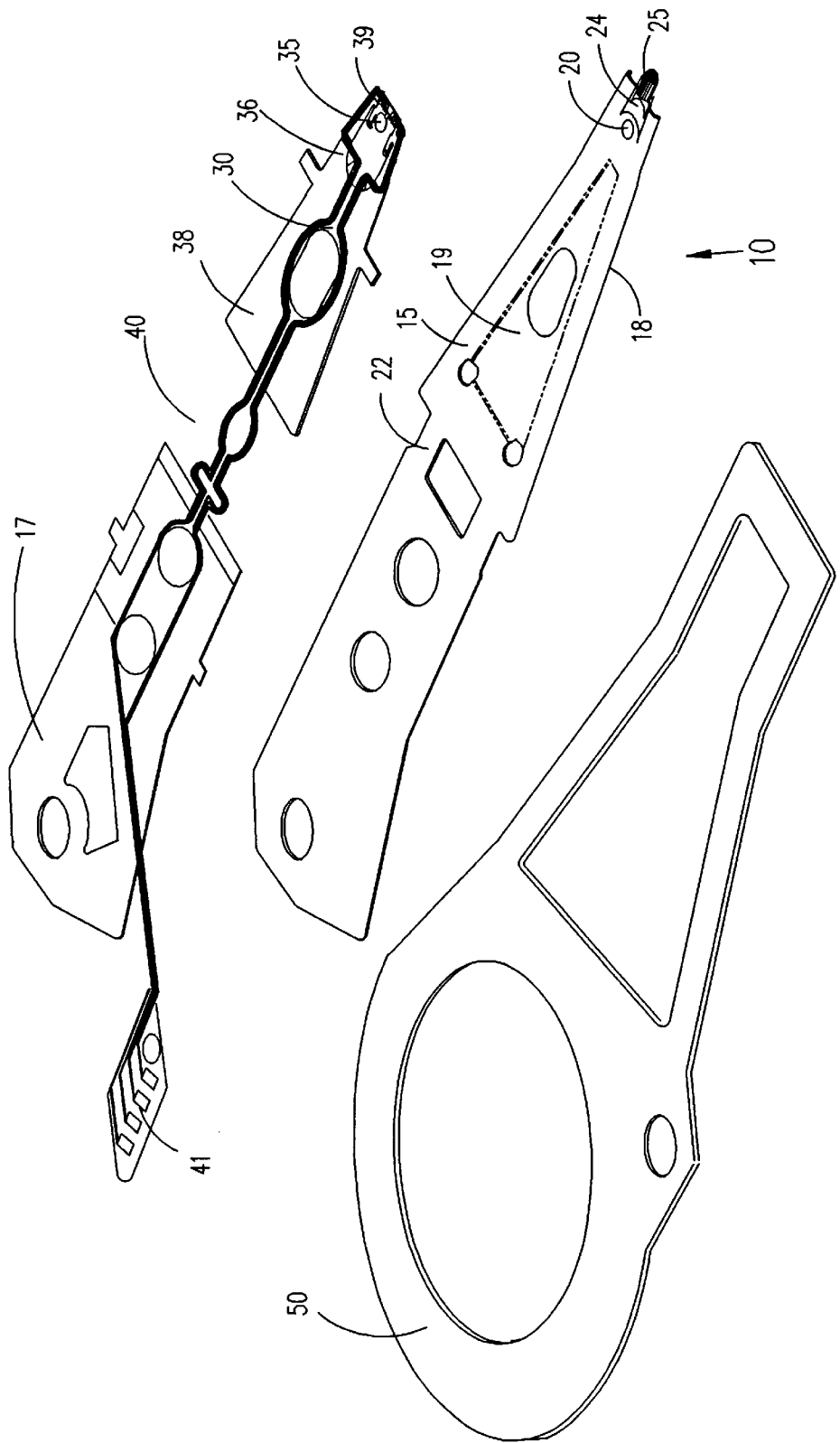
FIG. 1 is an exploded perspective view of a glide sensor suspension system of the present invention.
Figure 2:
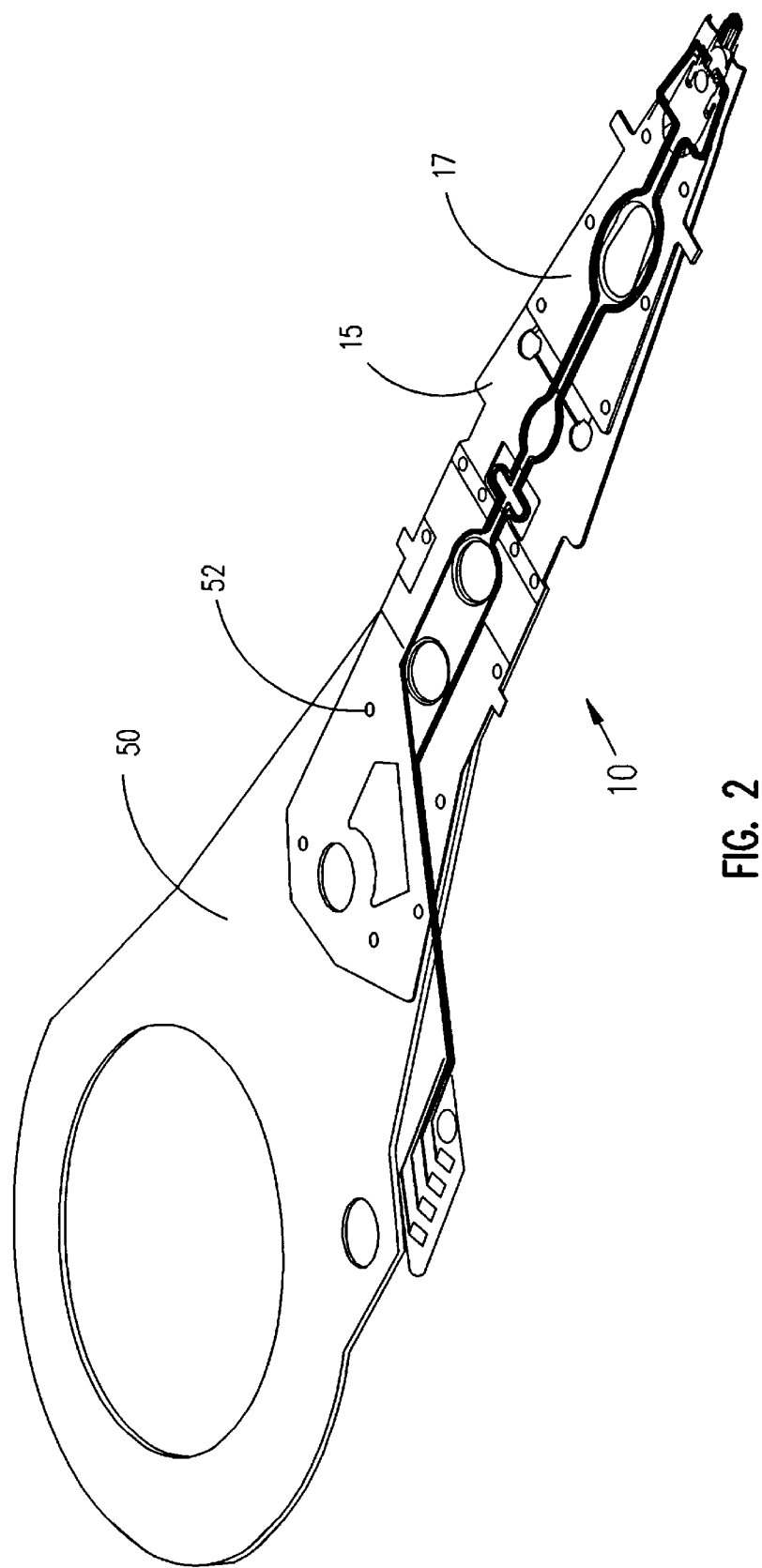
FIG. 2 is an assembled view of the suspension system of FIG. 1.

Referring to FIGS. 1 and 2, an integrated suspension structure 10 is illustrated in an exploded and in an assembled view for supporting and for electrically connecting a glide sensor in accordance with the present invention which reduces static stiffness and avoids random moments by the use of integrated leads and a flexible gimbal system, while providing electrical connections between the glide sensor and an output.

The suspension comprises a load beam support member 15 and a flexure member 17. The load beam 15 gives the suspension the correct load and overall stiffness. In the preferred embodiment, the load beam has formed features along both sides 18 and within the body 19 to increase stiffness and improve dynamic performance. The load beam is provided with a load projection 20 which preferably comprises a load dome. As will be explained in greater detail, the load projection 20 comprises a pivot point for supporting the glide slider and allowing it to pivot in any direction.

A hinge section 22 is provided which gives the correct gram load and allows the load beam to flex in the vertical direction to allow the glide slider to move vertically to follow the moving magnetic recording disk. An opening 24 may be provided at the distal end of the load beam to facilitate termination of the integrated leads to the glide sensor as will be explained. In the preferred embodiment, a tab 25 is formed at the distal tip for either merging of the suspension into a disk stack or for the purpose of performing dynamic loading and unloading of the glide slider during file testing, as will be understood by those skilled in the art.

The other element comprises flexure member 17 having conductors 30 formed integrally, preferably by a subtractive etch process. The flexure is comprised of a trilayer including a support layer, a dielectric layer and an electrical lead layer disposed on the dielectric layer. In the preferred embodiment, the support layer is steel, the dielectric layer is a polyimide, and the electrical lead layer is copper. The conductors 30 are integrally formed by selective shaping, such as by etching away the polyimide and copper layers in a photolithographic process.

The flexure is provided with a tongue 35 for attaching the glide sensor. The flexure has two side legs 36 from the first section 38 to the tongue and termination section 39, which provide high lateral stiffness and low pitch or roll stiffness to the glide slider so as to allow the glide slider to have enhanced flying attitude with respect to the magnetic recording disk.

At the hinge area 22 of the load beam, the flexure support is reduced in width, a "steel break" 40, which allows the conductor traces to follow the slope of the load beam without excessive stress. It also eliminates any effect of the flexure laminate on the gram load of the suspension under varying temperature and humidity conditions.

The conductor traces 30 are capable of any of several connection techniques at either the sensor termination end 39 or the tail or output termination end 41. These termination methods are well known to those skilled in the art and include ultrasonic bonding, solder ball placement and reflow, gold ball bonding, gold wire stitching, solder wire bonding, and other methods.

At the sensor termination end, the provision of conductor traces 30 and the termination connection of the traces to the glide sensor at termination end 39 provides nominally low static stiffness with limited variations in stiffness from only etching tolerances rather than the wide variations in stiffness that came from the assembly tolerances such as with the conventional discrete wired suspensions. Thus, the stiffness tolerances can be controlled tightly, which translates into tighter control of the slider flying height and attitude.

A mount plate 50 may be provided for supporting the load beam support member 15, and for mechanically connecting the suspension assembly to an actuator for repositioning the glide sensor to various positions with respect to the magnetic recording disk or mechanical surface which is being examined for asperities.

Referring to FIG. 2, the main section of the flexure member 17 is attached to the load beam support member 15, and one end of the load beam may be attached to mount plate 50 by spot welding at weld points 52.

Figure 3:
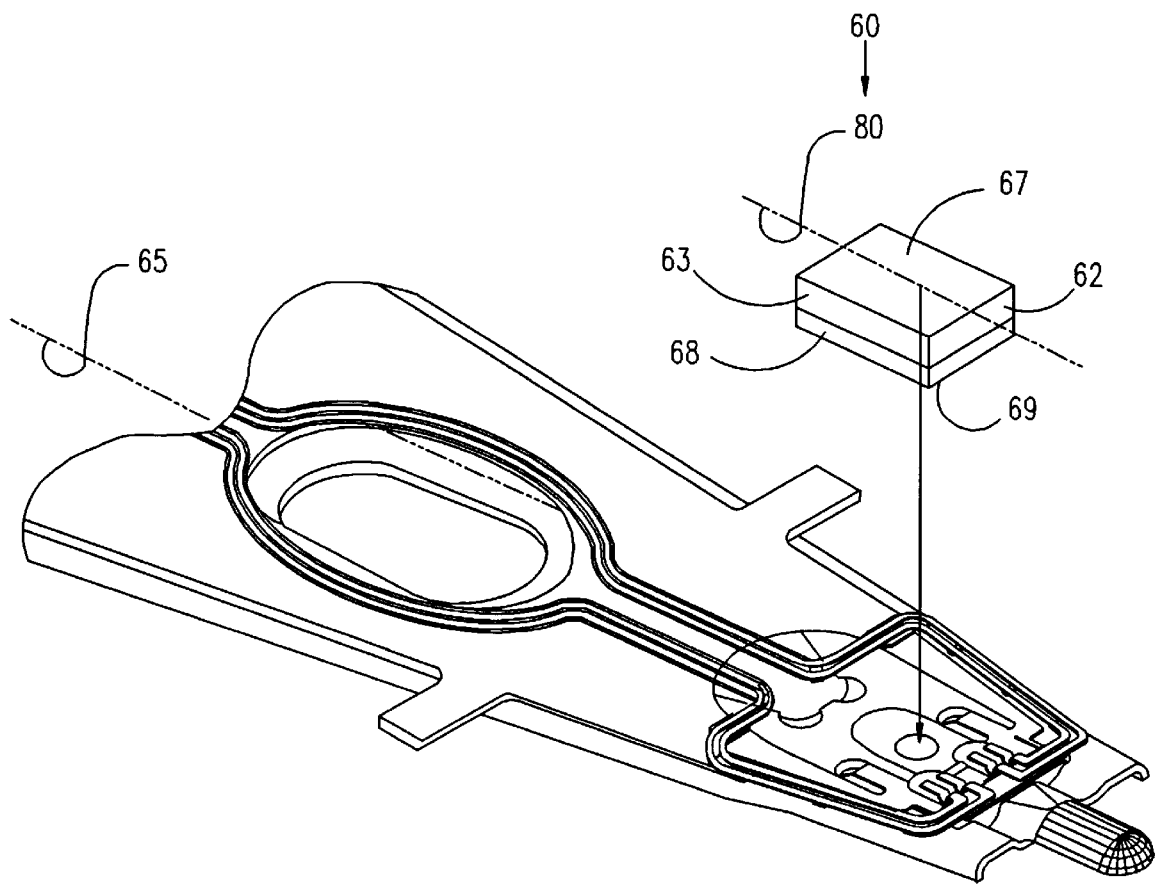
FIG. 3 is a perspective diagrammatic representation of the inline mounting of a glide sensor on the suspension system of FIGS. 1 and 2.

FIG. 3 is a perspective diagrammatic representation of the inline mounting of a glide sensor 60 on the suspension system of FIGS. 1 and 2. In the inline arrangement, the trailing edge 62 (or leading edge) of the slider 63 of an asperity contact glide sensor is perpendicular to an axis 65 centered on the suspension assembly. The slider has an air bearing surface 67 facing away from the suspension assembly. The sensor element 68, preferably comprising a piezoelectric or piezoresistive material as described above, is provided adjacent and preferably bonded to slider 63, to form the glide sensor 60. Referring additionally to FIG. 1, the glide sensor 60 is attached, using insulated epoxy, to tongue 35 of flexure member 17 at the "top" surface 69 of the sensor element 68. The conductors 30 at the sensor termination end 39 are also connected to the sensor element at the top surface 69 thereof.

Figure 4:
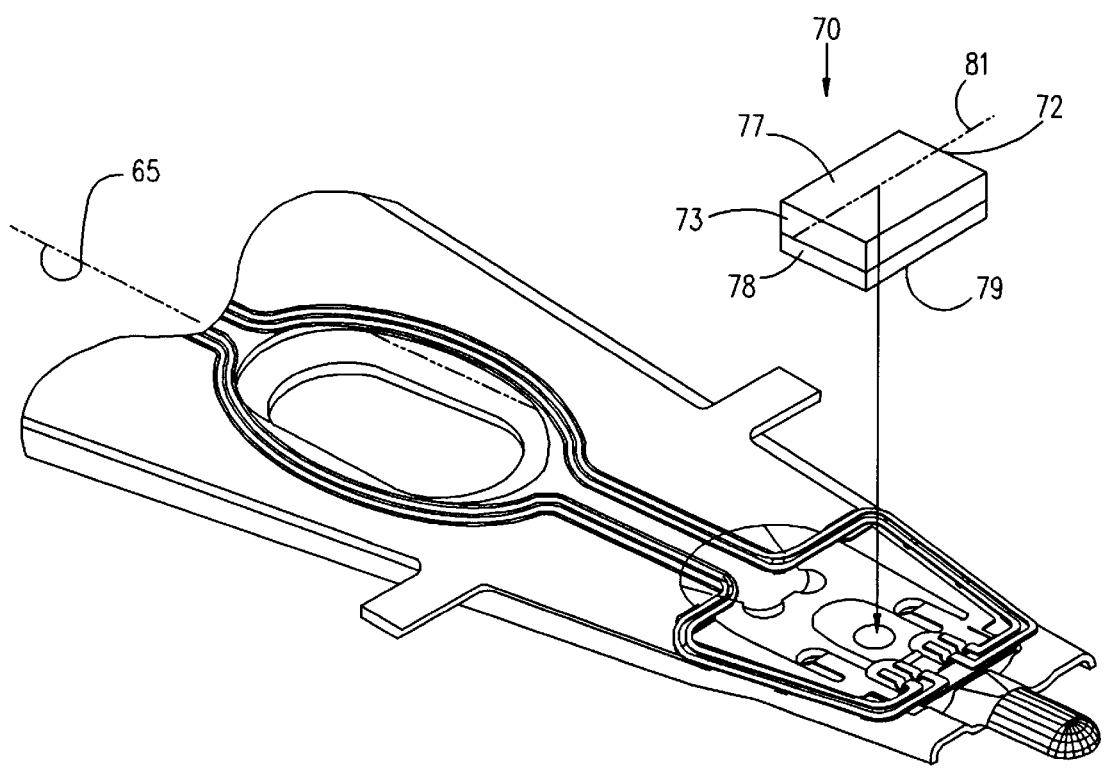
FIG. 4 is a perspective diagrammatic representation of the orthogonal mounting of a glide sensor on the suspension system of FIGS. 1 and 2.

FIG. 4 is a perspective diagrammatic representation of the orthogonal mounting of a glide sensor 70, such as a contact glide sensor, on the suspension system of FIGS. 1 and 2. In the orthogonal arrangement, the trailing edge 72 (or leading edge) of the slider 73 is parallel to the axis 65 centered on the suspension assembly. The slider has an air bearing surface 77 facing away from the suspension assembly. The sensor element 78, preferably comprising a piezoelectric or piezoresistive material as described above, is provided adjacent and preferably bonded to slider 73, to form the glide sensor 70. Referring additionally to FIG. 1, the glide sensor 70 is attached to tongue 35 of flexure member 17 at the "top" surface 79 of the sensor element 78. The conductors 30 at the sensor termination end 39 are also connected to the sensor element at the top surface 79 thereof.

In order to provide the optimum bidirectional roll characteristic for the slider 60 of FIG. 3 or the slider 70 of FIG. 4, the load projection 20 is preferably centered on the roll axis of the slider. The roll axis is perpendicular to the trailing or leading edge of the slider. Thus, for the inline slider of FIG. 3, roll axis 80 is parallel to the axis 65 of the suspension, and for the orthogonal slider of FIG. 4, roll axis 81 is perpendicular to the axis 65 of the suspension.

The load projection may also be centered on and symmetrical about the pitch axis of the slider, which axis is perpendicular to the roll axis of the slider.

In certain situations, it may be advantageous to mount the glide sensor asymmetrically (i.e., offset) with respect to the pivot point of load projection 20. An asymmetric arrangement may raise one edge of the slider and lower another or adjust the flying range of some air bearings. In addition, the asymmetric may be important for some air bearing designs.

The preferred embodiment of sensor element 68 or of sensor element 78 is a piezoelectric sensor. The most sensitive piezoelectric sensor is a plate of piezoelectric material bonded over the entire top surface of the glide slider. The sensor consists of a thin plate of the piezoelectric material and shaped electrodes, such as nickel or gold electrodes, on the top and bottom surfaces. In an example, the sensor may be approximately 0.2 mm in thickness, or thinner.

The sensor may have the same length and width as the glide slider. Alternatively, an "overhang" sensor may be provided which is larger than the slider and overhangs the slider at at least one edge. It is contemplated that one or more conductors 30 may comprise bent leads which connect to the side or bottom of the overhang sensor.

The current best mode comprises an enhanced piezoelectric sensor as described in the incorporated '207 patent. The enhancement of the sensor comprises the partitioning of the upper conductive layer of the sensor along the lines of symmetry of the slider's stress distribution. The sensor is called a mode selection sensor and allows measurement of the two halves of the sensor separately from the two isolated regions, as well as measurement of the whole sensor from both of the regions. The higher mode frequencies from the two isolated regions provides an indication of asperities on the surface being tested.

Figures 5A, 5B:
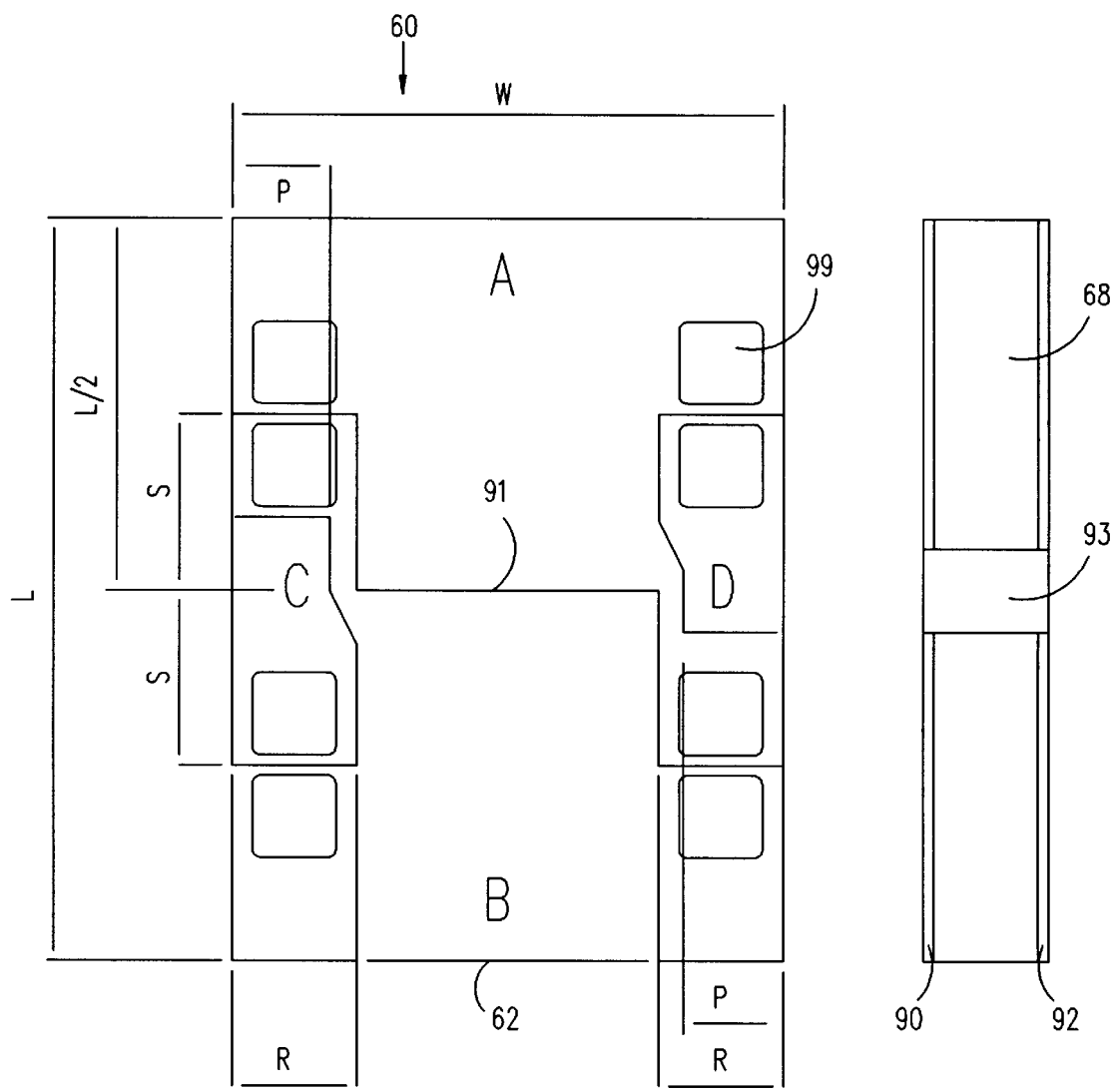
FIGS. 5A and 5B are, respectively, top and side views of electrical connections of the glide sensor of the present invention for inline mounting.

FIGS. 5A and 5B are, respectively, top and side views of the partitioning and of the electrical connections of the glide sensor element 60 of the present invention for inline mounting. As illustrated in FIG. 5A, the conductor 90 on the top surface of the sensor is broken into two halves "A" and "B". The split between the two halves is made by means of a cut 91. Access is gained to the conductor 92 on the reverse side of the sensor by employing conductor sections "C" and "D" and side-wrapping electrode or via 93. The sections are created by means of similar cuts into the conductor 90. Sections "C" and "D" are selected because of their location as not providing a significant contribution to the piezoelectric or piezoresistive signal from the modes that need to be sensed. The conductors "A", "B", "C", and "D" are each provided with connection pads 94 which may be symmetrically arranged on the sensor element. At least three of the connection pads are then connected to the termination ends 39 of the conductors 30. The symmetrical connections balance the piezoelectric or piezoresistive symmetry, maximizing its efficiency and sensitivity.

Access may alternatively be gained to conductor 92 on the reverse side of the sensor by means of bent lead termination of conductors 30, which directly contact electrode 93. Preferably, section C and D connection pads would be formed on the sides of the sensor at electrodes 93. In the case of an overhang sensor, the connection pads C and D could be formed at a bottom edge and one of the conductors 30 extended and bent to make the connection to pad C and D.

In an example, the width W of the glide sensor may be 1 mm and length L 1.25 mm, the conductor width P is 0.175 mm and the conductor width R is 0.215 mm.

As described above, the termination ends 39 of the conductors may be connected to the connection pads by any suitable means. Referring to FIG. 1, opening 24 is provided in load beam 15 to facilitate making those connections.

Alternatively, the termination ends 39 may comprise one or more bent leads which project to or around the sides of the sensor element to connection pads on the sides or undersurfaces of the sensor element, i.e., as in the case of an overhang sensor.

Figures 6A, 6B:
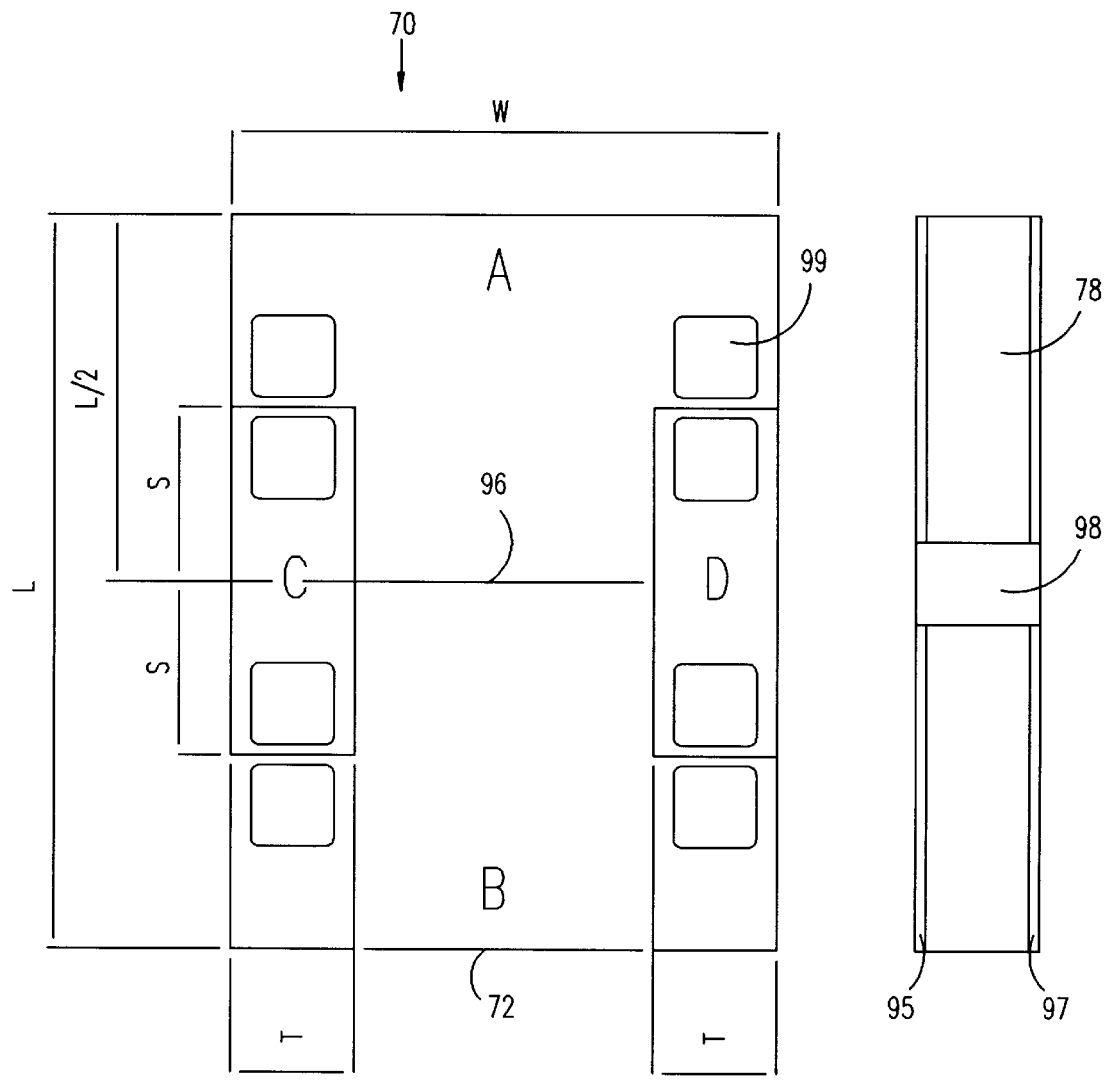
FIGS. 6A and 6B are, respectively, top and side views of electrical connections of the glide sensor of the present invention for orthogonal mounting.

FIGS. 6A and 6B are, respectively, top and side views of the partitioning and of the electrical connections of the glide sensor element 70 of the present invention for orthogonal mounting. As illustrated in FIG. 6A, the conductor 95 on the top surface of the sensor is broken into two halves "A" and "B". The split between the two halves is made by means of a cut 96. Access is gained to the conductor 97 on the reverse side of the sensor by employing conductor sections "C" and "D" and side-wrapping electrode or via 98. The conductors "A", "B", "C", and "D" are each provided with connection pads 99 which are symmetrically arranged on the sensor element. At least three of the connection pads are then connected to the termination ends 39 of the conductors 30 as described above.

Again, bent lead terminations may be used and two of the connection pads provided on the side or bottom of the sensor.

In an example, the width W of the glide sensor may be 1 mm and length L 1.25 mm, the conductor width S is 0.310 mm and the conductor width T is 0.215 mm.

Thus, a suspension for glide sensors is provided which reduces static stiffness and avoids random moments by the use of integrated leads and a flexible gimbal system, while providing electrical connections between the glide sensor and an output.

Figure 7:
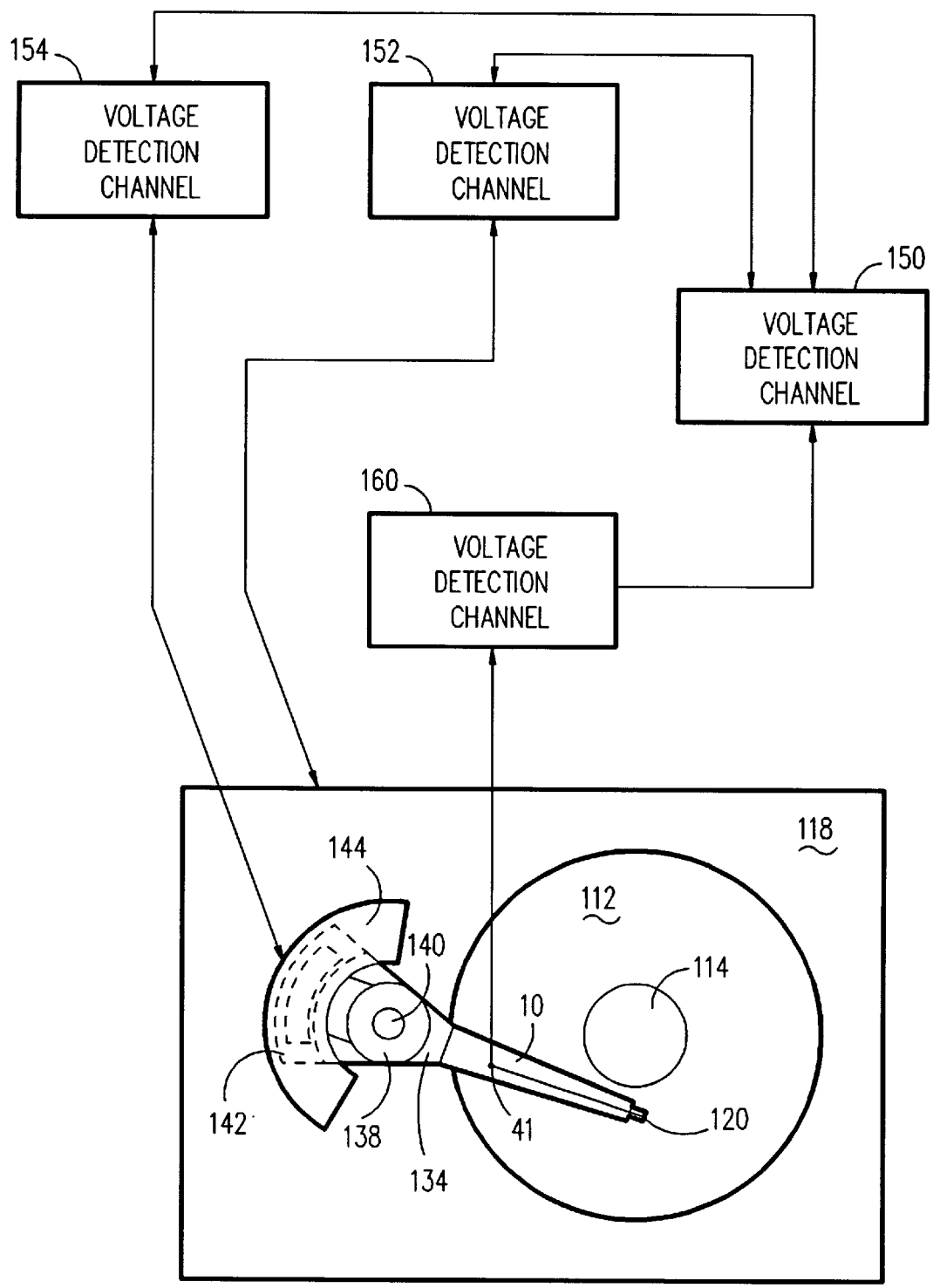
FIG. 7 is a diagrammatic representation of an asperity test system employing the glide sensor suspension of the present invention.

FIG. 7 illustrates an asperity test system 100 employing the glide sensor suspension 10 of the present invention. The test system mounts a disk to be tested 112 on a spindle 114, which is connected to a spindle motor (not shown). The spindle 114 is mounted for rotation on chassis 118.

A glide sensor 120 is mounted to the suspension 10 which is attached to an actuator arm 134. Actuator arm 134 is mounted on a rotary actuator 138. Alternatively, arm 134 may be an integral part of the actuator. Actuator 138 typically comprises a rotary bearing 140, a motor winding 142 and magnets 144, and is mounted to chassis 118.

A test controller 150 typically comprises a microprocessor and conducts the testing of disk 112. Test controller operates a spindle control 152 to rotate disk 112 at a constant velocity and sense the angular position of disk 112, providing the position in formation to test controller 150. The test controller 150 operates an actuator control 154 to position glide sensor 120 over disk 112 and sense the radial position of glide sensor 120, providing the position information to test controller 150.

Voltage detection channel 160 is connected to output termination end 41 to detect the output of glide sensor 120. Thus, upon glide sensor 120 contacting an asperity, the analog voltage signals from the sensor 120 are detected as an asperity by the voltage detection channel 160 and digital detection signals provided to test controller 150. Test controller 150 determines the location of the detected asperity by the sensed radial location from actuator control 154 and the angular location from spindle control 152. Thus, test controller 150 accumulates the type of asperity in accordance with the analysis of the output of voltage detection channel 160 as taught by the incorporated '207 patent, and accumulates the precise location of the asperity on disk 112 as obtained from actuator control 154 and spindle control 152.

While the preferred embodiments of the present invention have been illustrated in detail, it should be apparent that modifications and adaptations to those embodiments may occur to one skilled in the art without departing from the scope of the present invention as set forth in the following claims.

We claim:

1. A glide sensor assembly comprising:
   an asperity contact glide sensor, said sensor having a slider and a sensor element having electrical connection pads, said sensor element comprising a sensor layer and layers of conductive material on the top and bottom surfaces thereof, and said electrical connection pads are on said top surface, at least one of said electrical connection pads is separated from said top surface conductive material and connected to said bottom surface conductive material by means of a side-wrapping electrode;
   a load beam support member having a load projection at one end thereof; and
   a flexure member having electrical leads formed thereon, and a support layer and a dielectric layer separating said electrical leads from said support layer, said flexure member electrical leads comprising a shaped conductive layer disposed on said dielectric layer, said flexure member having first and second sections, said first section fixedly attached to said load beam support member and said electrical leads having output connections at said first section, said second section comprising a gimbal flexure section supported by said load projection of said load beam support member and having said asperity contact glide sensor affixed thereon, said electrical leads connected to said sensor element electrical connection pads on at least one surface of said sensor element, whereby said sensor element is electrically connected to said output connections.

2. A glide sensor assembly comprising:
   an asperity contact glide sensor, said sensor having a slider and a sensor element having electrical connection pads, said sensor element comprising a sensor layer and layers of conductive material on the top and bottom surfaces thereof, and said electrical connection pads are on said top surface, at least one of said electrical connection pads is separated from said top surface conductive material and connected to said bottom surface conductive material by means of a via electrode;
   a load beam support member having a load projection at one end thereof; and
   a flexure member having electrical leads formed thereon, and a support layer and a dielectric layer separating said electrical leads from said support layer, said flexure member electrical leads comprising a shaped conductive layer disposed on said dielectric layer, said flexure member having first and second sections, said first section fixedly attached to said load beam support member and said electrical leads having output connections at said first section, said second section comprising a gimbal flexure section supported by said load projection of said load beam support member and having said asperity contact glide sensor affixed thereon, said electrical leads connected to said sensor element electrical connection pads on at least one surface of said sensor element, whereby said sensor element is electrically connected to said output connections.

3. A glide sensor assembly comprising:
   an asperity contact glide sensor, said sensor having a slider and a sensor element having electrical connection pads, said sensor element comprising a layer of piezoelectric material and layers of conductive material on the top and bottom surfaces thereof, and said electrical connection pads are on said top surface, at least one of said electrical connection pads is separated from said top surface conductive material and connected to said bottom surface conductive material by means of a side-wrapping electrode;
   a load beam support member having a load projection at one end thereof; and
   a flexure member having electrical leads formed thereon, and a support layer and a dielectric layer separating said electrical leads from said support layer, said flexure member electrical leads comprising a shaped conductive layer disposed on said dielectric layer, said flexure member having first and second sections, said first section fixedly attached to said load beam support member and said electrical leads having output connections at said first section, said second section comprising a gimbal flexure section supported by said load projection of said load beam support member and having said asperity contact glide sensor affixed thereon, said electrical leads connected to said sensor element electrical connection pads on at least one surface of said sensor element, whereby said sensor element is electrically connected to said output connections.

4. A glide sensor assembly comprising:
   an asperity contact glide sensor, said sensor having a slider and a sensor element having electrical connection pads, said sensor element comprising a layer of piezoelectric material and layers of conductive material on the top and bottom surfaces thereof, and said electrical connection pads are on said top surface, at least one of said electrical connection pads is separated from said top surface conductive material and connected to said bottom surface conductive material by means of a via electrode;

a load beam support member having a load projection at one end thereof; and a flexure member having electrical leads formed thereon, and a support layer and a dielectric layer separating said electrical leads from said support layer, said flexure member electrical leads comprising a shaped conductive layer disposed on said dielectric layer, said flexure member having first and second sections, said first section fixedly attached to said load beam support member and said electrical leads having output connections at said first section, said second section comprising a gimbal flexure section supported by said load projection of said load beam support member and having said asperity contact glide sensor affixed thereon, said electrical leads connected to said sensor element electrical connection pads on at least one surface of said sensor element, whereby said sensor element is electrically connected to said output connections.

5. A glide sensor assembly comprising:

a mode selection glide sensor, said sensor having a slider and a mode selection sensor element having electrical connection pads, said sensor element comprising a partitioned piezoelectric element having a layer of conductive material on each partition of the top surface thereof and a layer of conductive material on the bottom surface thereof, and said electrical connection pads are on said top surface, at least one of said electrical connection pads separated from said top surface conductive material and connected to said bottom surface conductive material by means of a side-wrapping electrode;

a load beam support member having a load projection at one end thereof; and a flexure member having electrical leads formed thereon, and a support layer and a dielectric layer separating said electrical leads from said support layer, said flexure member electrical leads comprise a shaped conductive layer disposed on said dielectric layer, said flexure member having first and second sections, said first section fixedly attached to said load beam support member and said electrical leads having output connections at said first section, said second section comprising a gimbal flexure section supported by said load projection of said load beam support member and having said mode selection glide sensor affixed thereon, said electrical leads connected to said mode selection sensor element electrical connection pads on at least one surface of said mode selection sensor element, whereby said sensor element is electrically connected to said output connections.

6. A glide sensor assembly comprising:

a mode selection glide sensor, said sensor having a slider and a mode selection sensor element having electrical connection pads, said sensor element comprising a partitioned piezoelectric element having a layer of conductive material on each partition of the top surface thereof and a layer of conductive material on the bottom surface thereof, and said electrical connection pads are on said top surface, at least one of said electrical connection pads separated from said top surface conductive material and connected to said bottom surface conductive material by means of a via electrode;

a load beam support member having a load projection at one end thereof; and a flexure member having electrical leads formed thereon, and a support layer and a dielectric layer separating said electrical leads from said support layer, said flexure member electrical leads comprise a shaped conductive layer disposed on said dielectric layer, said flexure member having first and second sections, said first section fixedly attached to said load beam support member and said electrical leads having output connections at said first section, said second section comprising a gimbal flexure section supported by said load projection of said load beam support member and having said mode selection glide sensor affixed thereon, said electrical leads connected to said mode selection sensor element electrical connection pads on at least one surface of said mode selection sensor element, whereby said sensor element is electrically connected to said output connections.

* * * * *